US011231062B2

(12) United States Patent
Freis et al.

(10) Patent No.: US 11,231,062 B2
(45) Date of Patent: Jan. 25, 2022

(54) MECHANICAL JOINING TOP SHEET ISOLATION

(71) Applicant: Ford Global Technologies, LLC, Dearborn, MI (US)

(72) Inventors: Amanda Kay Freis, Ann Arbor, MI (US); Vlad Bogachuk, West Bloomfield, MI (US); Aindrea McKelvey Campbell, Beverly Hills, MI (US); Jason Balzer, Commerce Township, MI (US); Kim Lazarz, Ypsilanti, MI (US); Joy Hines Forsmark, Saint Claire Shores, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 748 days.

(21) Appl. No.: 14/625,808

(22) Filed: Feb. 19, 2015

(65) Prior Publication Data

US 2016/0245323 A1 Aug. 25, 2016

(51) Int. Cl.
*F16B 19/08* (2006.01)
*B21J 15/02* (2006.01)
*F16B 5/04* (2006.01)

(52) U.S. Cl.
CPC ........... *F16B 19/086* (2013.01); *B21J 15/025* (2013.01); *F16B 5/04* (2013.01)

(58) Field of Classification Search
CPC .......... B21D 39/00; B21J 15/025; F16B 5/04; F16B 19/086
See application file for complete search history.

(56) References Cited

U.S. PATENT DOCUMENTS 1,930,451 A * 10/1933 Luebbe ..................... F16B 5/04
  220/692
2,228,779 A * 1/1941 Pavlecka ................... B63B 3/68
  220/681

(Continued)

FOREIGN PATENT DOCUMENTS

CN 103062202 A 4/2013
EP 0999075 A2 5/2000

OTHER PUBLICATIONS

Engineering360, retrieved Apr. 15, 2019 from <https://www.globalspec.com/learnmore/materials_chemicals/adhesives/rubber_adhesives_sealants>, pdf of which is attached. (Year: 2019).*

*Primary Examiner* — Christopher M Koehler

(57) ABSTRACT

A system is provided for attaching a layer of a metal to other layers in a material stack-up using a metal mechanical fastener that does not allow for direct contact between the fastener and the metal layer, thereby neutralizing any galvanic reaction between the metal sheet and the fastener and avoiding corrosion. The metal layer may be any of several metals, including magnesium. The fastener is a rivet, a screw or a bolt. The disclosed inventive concept uses an insulating layer to insulate the magnesium layer. In one embodiment, a layer of a thin metal is formed over the insulating layer. Where the fastener is a rivet and the metal is magnesium, the insulating layer and thin metal provide a barrier between the magnesium layer and the rivet prongs following rivet insertion, thus isolating the rivet. The system enables a greater application of fastener joining, particularly with magnesium and mixed material joining.

9 Claims, 4 Drawing Sheets

(56) References Cited

U.S. PATENT DOCUMENTS

| | | | |
|---|---|---|---|
| 2005/0086799 A1* | 4/2005 | Kato | B21J 15/025 29/798 |
| 2005/0133483 A1* | 6/2005 | Hou | B23K 11/0066 219/118 |
| 2006/0067806 A1* | 3/2006 | Denslow | F16B 5/04 411/504 |
| 2008/0149256 A1* | 6/2008 | Wang | B21J 15/025 156/92 |
| 2008/0173696 A1* | 7/2008 | Gendou | B21J 15/025 228/112.1 |
| 2009/0194224 A1* | 8/2009 | Jendrny | B21J 15/02 156/92 |
| 2012/0180305 A1* | 7/2012 | Bartig | F16B 19/086 29/525.06 |
| 2012/0258328 A1* | 10/2012 | Carlson | B21J 15/025 428/583 |
| 2013/0000101 A1* | 1/2013 | Rintelmann | F16B 19/00 29/525.03 |
| 2013/0336745 A1* | 12/2013 | Trinick | F16B 19/086 411/501 |
| 2013/0340239 A1* | 12/2013 | Ueda | B21J 15/025 29/525.06 |
| 2015/0183022 A1* | 7/2015 | Trinick | B21J 15/025 29/524.1 |
| 2016/0332215 A1* | 11/2016 | Blacket | B21D 39/03 |

\* cited by examiner

MECHANICAL JOINING TOP SHEET ISOLATION

TECHNICAL FIELD

The disclosed inventive concept relates generally to mechanical fastening systems for joining a mixed material stack-up. More particularly, the disclosed inventive concept relates to a system that mechanically joins a mixed material stack-up having a magnesium upper layer where corrosion between the fastener and the magnesium upper layer is avoided by insulating the fastener from the magnesium upper layer.

BACKGROUND OF THE INVENTION

The automobile manufacturing industry is constantly faced with new challenges in a wide array of areas including vehicle safety, reliability, durability and cost. Perhaps the greatest challenge faced by the automobile industry today is the need to improve fuel mileage to both decrease carbon emissions and increase fuel economy for both environmental and cost reasons, all without compromising safety, power or durability. In 2011, new fuel economy requirements were imposed that establish a US vehicle fleet average of 54.5 miles per gallon by 2025. As the industry moves to that target year fuel annual economy requirements will be ramped up for different-sized vehicles.

Efforts have been made to increase fuel economy for vehicles. These efforts can be divided into two approaches: the "supply" side and the "demand" side.

On the supply side attention is drawn to improving energy conversion efficiency through use of, for example, electric or hybrid-electric drive trains. In addition, new vehicle drive trains, including smaller engines and more efficient transmission having multiple gears and transfer cases, are being developed and employed. Other technologies, including start-stop and engine cylinder deactivation strategies, are also proving effective at decreasing fuel consumption. Improved transmissions with multiple gears are also important elements to increased fuel consumption efficiencies.

On the demand side weight reduction is key, though other aspects, such as improved aerodynamics and drag reduction, are also important. Conventional vehicles, particularly trucks, rely on steel components. For over 100 years the material of choice for most vehicles is steel. Today steel makes up about 60% of the average car by weight.

Despite the improvement in steel composition the weight of steel regardless of type remains significant. It is also possible to reduce vehicle weight when steel is used by reducing component thickness. However, at a certain point it is no longer practical to reduce steel thickness regardless of the steel grade used. The use of high strength steel or advanced, high strength steel does not improve the realization that there are limits to how much vehicle weight can be reduced by steel thickness reduction without compromising vehicle performance.

Thus as the automotive industry continues to focus on light weighting vehicles to meet customer expectations on fuel economy and CAFE requirements, interest in alternative materials including aluminum intensive vehicle applications has increased. This is because vehicle weight reduction is most directly accomplished through substituting lighter materials for currently used steel parts. However, a limited variety of materials is available as a substitute for automotive steel. One such material is carbon fiber which is both lightweight and strong.

Accordingly, much attention is drawn to the use of light-weight metals, such as magnesium, which demonstrate significant weight advantages over traditional steel. The use of magnesium not only provides weight reduction but also results in good crash performance. Research has shown that in collisions magnesium can perform well.

In body-in-white structures, joining methods have traditionally relied on resistance-spot welding (e.g., in steel structures). In the case of magnesium as a vehicle material used in conjunction with other metals, joining applications often rely on self-piercing rivet (SPR) technology that use an engineered rivet. According to SPR technology, self-piercing rivets do not require a drilled or punched hole, unlike solid rivets and blind rivets.

One advantage of SPR technology is that it is a high production volume assembly process. Further, it is compatible with an adhesive, where both methods can be used in conjunction.

As mixed material joining continues to grow magnesium applications continue to develop. One concern related to the riveting of magnesium when it is present in the top sheet of the material stack up is the corrosion concern between the fastener and the magnesium top sheet. Eliminating this concern would increase the usage of magnesium sheeting in vehicle assembly.

As in so many areas of vehicle technology there is always room for improvement related to the mechanical fastening of magnesium materials.

SUMMARY OF THE INVENTION

The disclosed inventive concept overcomes the problems associated with known systems and methods for joining materials together of which the upper sheet is a metal, such as magnesium. The disclosed inventive concept provides a solution that allows the use of metal mechanical fasteners to mechanically join a mixed material stack-up having a metal, such as magnesium as a top layer where corrosion is avoided. The metal mechanical fastener is selected from the group consisting of rivets, screws and bolts. Rivets include self-piercing rivets, blind rivets, and solid rivets. Screws include, for example, flow drill screws.

The disclosed inventive concept provides for the use of an isolation barrier between the fastener and the top layer of material in the joint. The fastener is inserted through the isolation barrier. One example of a barrier is a layer of aluminum. Another example of the barrier is a layer of tape. After the fastener is inserted, the barrier provides a barrier between the top sheet and the fastener, thus isolating the fastener.

An advantage of the disclosed inventive concept is that it enables a greater application of joining mechanical fasteners, particularly with metals such as magnesium and mixed material joining. Another advantage of the disclosed inventive concept is that it can be used on any material to isolate the metal fastener from the sheet of metal beneath the barrier, specifically when there is a large difference in galvanic potential between the substrate material (that may include carbon fiber material) and the metal fastener. It is a lower cost and lighter weight solution than using an additional piece of metal on top of the magnesium to sandwich the joint. The disclosed inventive concept also eliminates concern from vehicle operations in regards to trying to locate an additional material for use in production.

The above advantages and other advantages and features will be readily apparent from the following detailed description of the preferred embodiments when taken in conjunction with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1A:
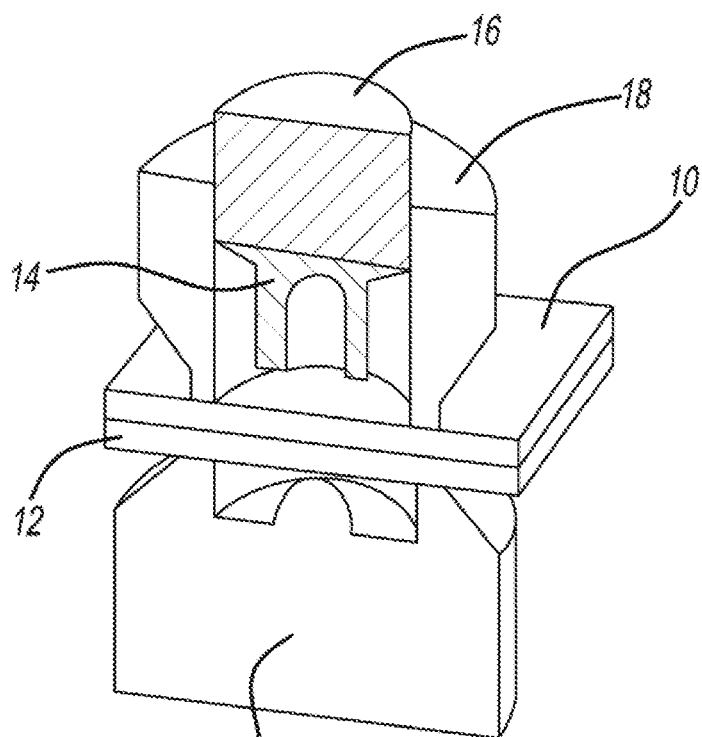
FIG. 1A is a schematic illustration of the first step of a self-piercing rivet process according to the prior art in which the blankholder and the punch are in position above the rivet prior to pressure being applied to the punch.

In the following figures, the same reference numerals will be used to refer to the same components. In the following description, various operating parameters and components are described for different constructed embodiments. These specific parameters and components are included as examples and are not meant to be limiting.

The disclosed inventive concept may find use in any number of applications where plural layers of the same or dissimilar materials are being attached. Accordingly, the disclosed inventive concept may be used in the production of automotive vehicles and trucks.

The use of metal mechanical fasteners, such as self-piercing rivets, in the assembly of plural components is a known technique as illustrated in FIGS. 1A through 1D. These figures schematically show steps involved in the self-piercing rivet process. As the rivet is inserted into the stack, the material deforms into the die and the resultant form is called a "button."

As illustrated in FIG. 1A, the first step of a self-piercing rivet process according to the prior art is illustrated. A first layer 10 is shown in position over a second layer 12. A rivet 14 is illustrated in position over the first layer 10. A punch 16 and a blankholder 18 are illustrated in position with the rivet 14 prior to pressure being applied to the punch 16. A die 20 is in position beneath the second layer 12.

Figure 1B:
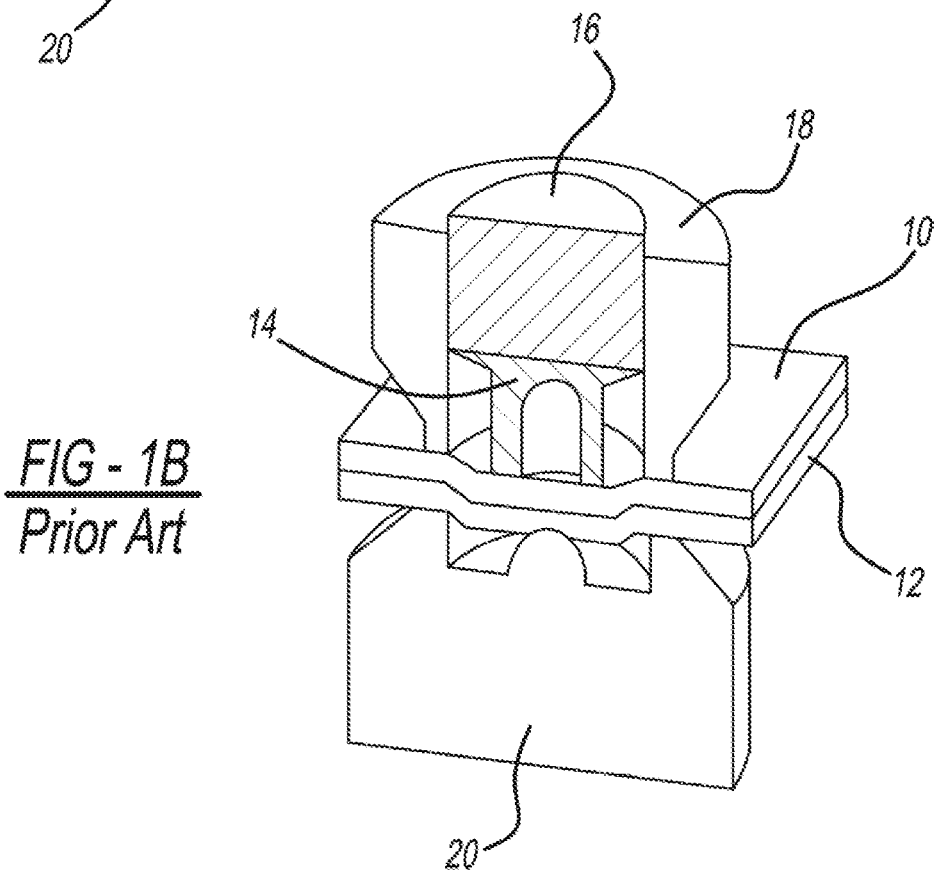
FIG. 1B is a schematic illustration of the second step of the self-piercing rivet process according to the prior art in which initial pressure has been applied to the punch.

In FIG. 1B, the second step of the self-piercing rivet process according to the prior art is illustrated. In this step, initial pressure has been applied to the punch 16 and the rivet 14 is shown beginning to deform the first layer 10 and the second layer 12.

Figure 1C:
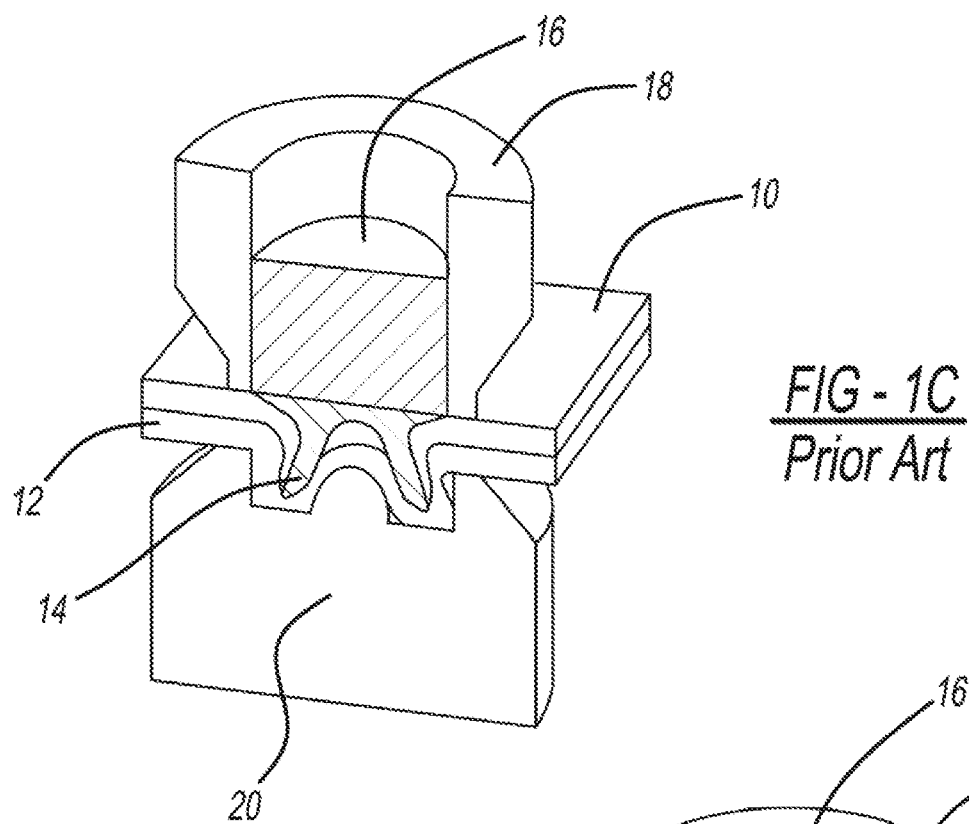
FIG. 1C is a schematic illustration of the third step of the self-piercing rivet process according to the prior art in which the rivet has pierced the upper layer and is interlocked into the lower layer.

In FIG. 1C, the third step of the self-piercing rivet process according to the prior art is illustrated. In this step, the punch 16 has been fully inserted through the blankholder 18 such that the rivet 14 pierced the first layer 10 and forms the second layer 12.

Figure 1D:
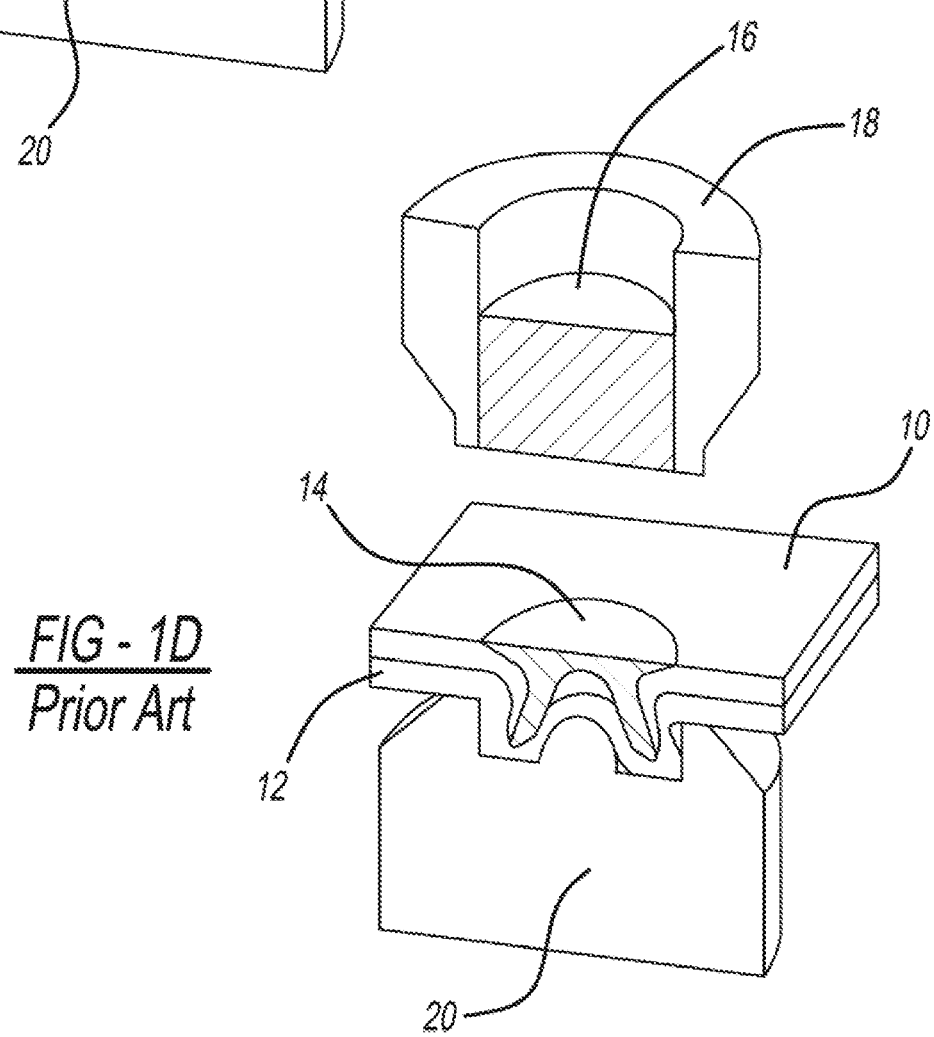
FIG. 1D is a schematic illustration of the fourth step of the self-piercing rivet process according to the prior art in which the rivet process has been completed and the punch and blankholder have been removed.

In FIG. 1D, the fourth step of the self-piercing rivet process according to the prior art is illustrated. In this step, the rivet 14 is shown fully inserted through the first layer 10 and a button is formed in the second layer 12. The punch 16 and the blankholder 18 have been moved out of contact with the first layer 10.

The self-piercing rivet process shown in FIGS. 1A through 1D and described in conjunction therewith may be used in the joining of any number of materials, including magnesium. This is consistent with the general increase industry-wide of the joining of mixed materials with one such material being magnesium.

Figure 2:
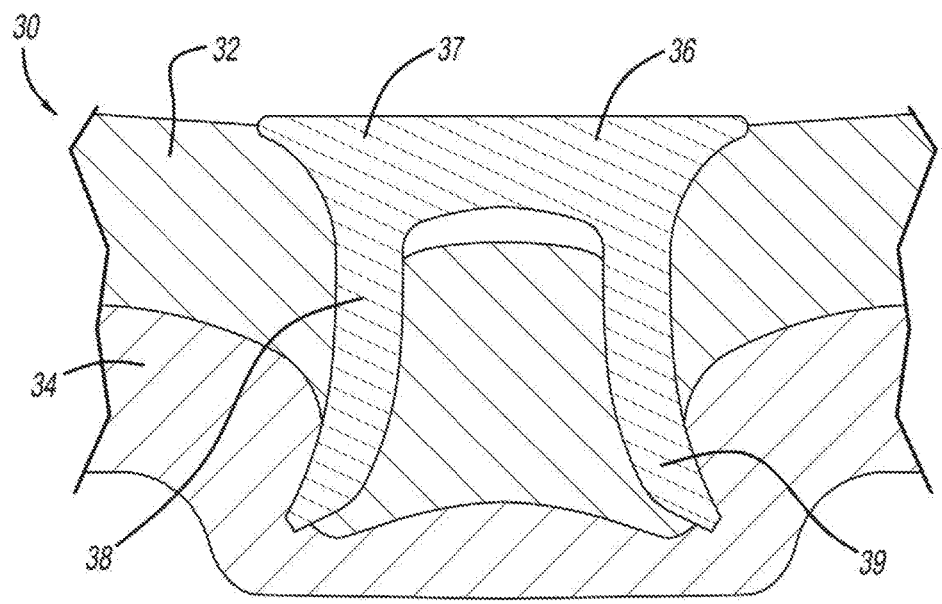
FIG. 2 is a schematic view of a joint according to the prior art in which a metal top sheet is riveted to a lower sheet.

Referring to FIG. 2, a schematic view of a prior art joint, generally illustrated as 30, is shown. A metal top sheet 32 is fitted over a bottom sheet 34. A self-piercing rivet 36 having a rivet head 37, a rivet shank 38 and a rivet foot 39 is inserted in a known manner to thereby attach together the metal top sheet 32 and the bottom sheet 34.

While the magnesium top sheet 32 may be successfully attached to the bottom sheet 34 using the self-piercing rivet 36, one concern related to the riveting of the magnesium top sheet 32 in the material stack-up is the corrosion concern between the rivet head 37 and the magnesium top sheet 32 because of direct metal-to-metal contact. Such corrosion may lead to failure of the mechanical attachment and separation of the joined materials.

Figure 3:
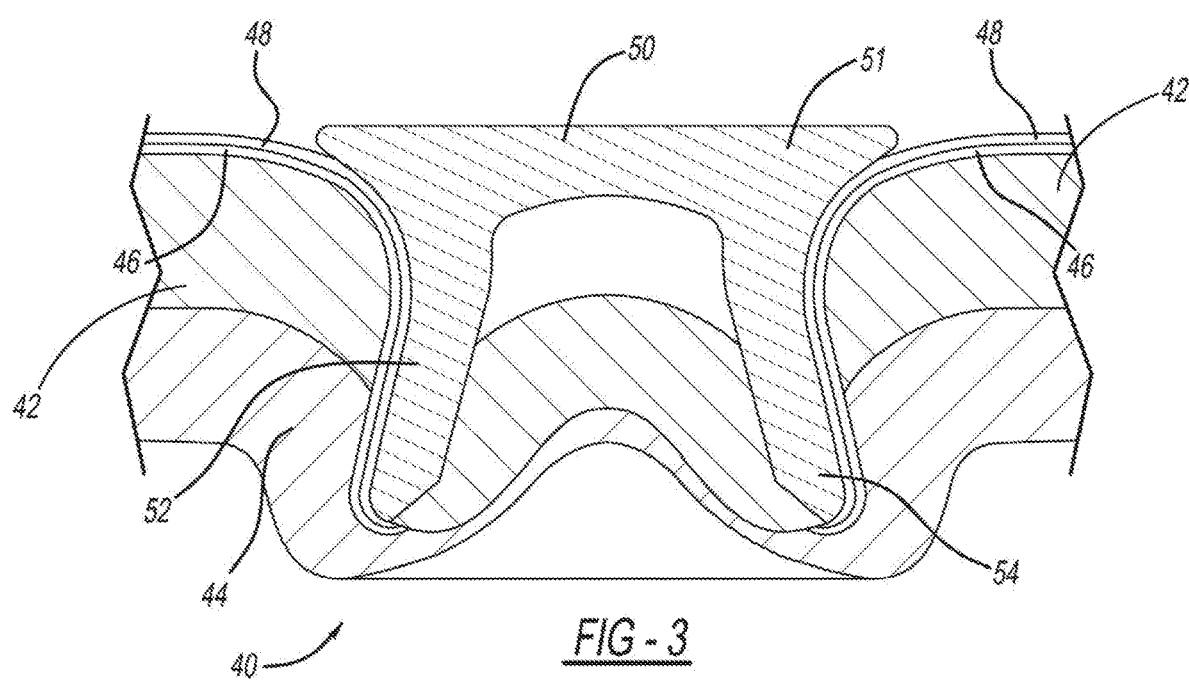
FIG. 3 is a schematic view of a joint according to a first embodiment of the disclosed inventive concept in which an insulating layer and an upper metal layer have been formed over the metal top sheet.

The disclosed inventive concept provides a practical and cost-effective solution to the problem of corrosion that results when a metal rivet is used to join a metal top sheet, such as a magnesium top sheet, with one or more additional layers. The disclosed inventive concept may be used with a material to isolate the metal fastener from the top metal sheet, and specifically is useful when there is a large difference in galvanic potential between the substrate material and the metal mechanical fastener. The solution of the disclosed inventive concept is illustrated in FIG. 3 in which a schematic view of a joint, generally illustrated as 40, is shown. A metal top sheet 42 composed of a metal, such as, but not limited to magnesium, is placed over a bottom sheet 44. The bottom sheet 44 may be of any of a variety of materials including metals (such as steel or, more particularly, carbon steel grade [DP800]) or carbon-fiber composites.

An insulating layer 46 is applied over the metal top sheet 42. The insulating layer 46 may be applied over the entire metal top sheet 42 or only over areas into which rivets will be pierced. The insulating layer 46 may be composed of any of several materials, including, but not limited to, aluminum or synthetic cellulose acetate. Preferably the insulating layer 46 has an adhesive layer for easy attachment to the metal top sheet 42. The adhesive layer may be composed of, for example, synthetic rubber resin and may include a release tape (not shown) that is removed prior to attachment to the metal top sheet 42.

A relatively thin outer metal layer 48 composed of any of several metals is applied over the insulating layer 46. A metal mechanical fastener 50 metal top is inserted in a known manner to thereby attach together the outer metal layer 48, the tape layer 46, metal top sheet 42 and the bottom sheet 44. The metal mechanical fastener 50 may be a rivet, a screw or a bolt. Possible choices for a rivet include a self-piercing rivet, a blind rivet and a solid rivet. The screw may be of several types, and may be, for example, a flow drill screw. The illustrated metal mechanical fastener 50 is provided for suggestive purposes only and is not intended as being limiting. The illustrated metal mechanical fastener 50 includes a rivet head 51, a rivet shank 52, and a rivet foot 54. The outer metal layer 48 is provided to protect the insulating layer 46 and to prevent damage to the insulating layer 46 that might otherwise result upon insertion of the metal mechanical fastener 50 into the layers of material.

According to the disclosed inventive concept, the insulating layer 46 and the outer metal layer 48 provide a protective barrier between the metal mechanical fastener 50 and the rivet head 51 and the metal sheet 42, thus preventing direct contact between the metal mechanical fastener 50 and the rivet head 51 and the metal sheet 42. Without direct contact of the metal mechanical fastener 50 and the rivet head 51 with the metal sheet 42, the galvanic potential is neutralized and corrosion is prevented. Thus the disclosed inventive concept provides a practical and cost-effective solution to the problem of corrosion when certain metals, such as magnesium sheets, are used in a material stack-up that is fastened together by a metal mechanical fastener.

Figure 4:
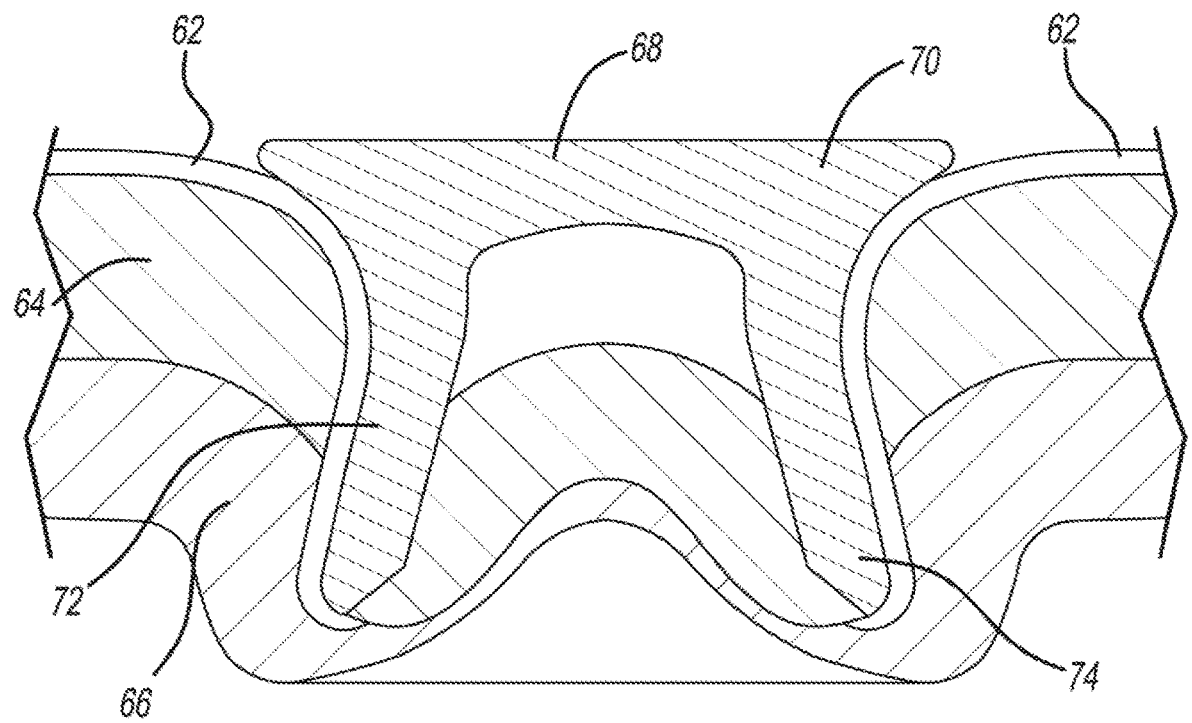
FIG. 4 is a schematic view of a joint according to a second embodiment of the disclosed inventive concept in which an insulating layer has been formed over a magnesium layer.

FIG. 4 illustrates an alternative embodiment of the disclosed inventive concept in which a schematic view of a joint, generally illustrated as 60, is shown. A top sheet 62, such as aluminum or tape, is placed over a magnesium layer 64. The top sheet 62 may be composed of any of several materials, including, but not limited to aluminum or synthetic cellulose acetate. The top sheet 62 may have an adhesive later for easy attachment to the magnesium layer 64. The adhesive layer may be composed of, for example, synthetic rubber resin and may include a release tape (not shown) that is removed prior to attachment to the magnesium layer 64. The magnesium layer 64 is placed over a base layer 66. The base layer 66 may be of any of a variety of metals such as, but not limited to, steel, particularly carbon steel grade (DP800).

A metal mechanical fastener 68 metal top is inserted in a known manner to thereby attach together the top sheet 62, the magnesium layer 64, and the base layer 66. The metal mechanical fastener 68 may be a rivet, a screw or a bolt. Possible choices for a rivet, include a self-piercing rivet, a blind rivet and a solid rivet.

The screw may be of any of several types, and may be, for example, a flow drill screw. The illustrated mechanical fastener 68 is provided for suggestive purposes only and is not intended as being limiting. The illustrated metal mechanical fastener 68 includes a rivet head 70, a rivet shank 72, and a rivet foot 74.

According to the disclosed inventive concept of FIG. 4, the top sheet layer 62 provide a protective barrier between the metal mechanical fastener 68 and the rivet head 70 and the magnesium layer 64. Without direct contact of the metal mechanical fastener 68 and the rivet head 70 with the magnesium layer 64, the galvanic potential is neutralized and corrosion is prevented.

Figure 5:
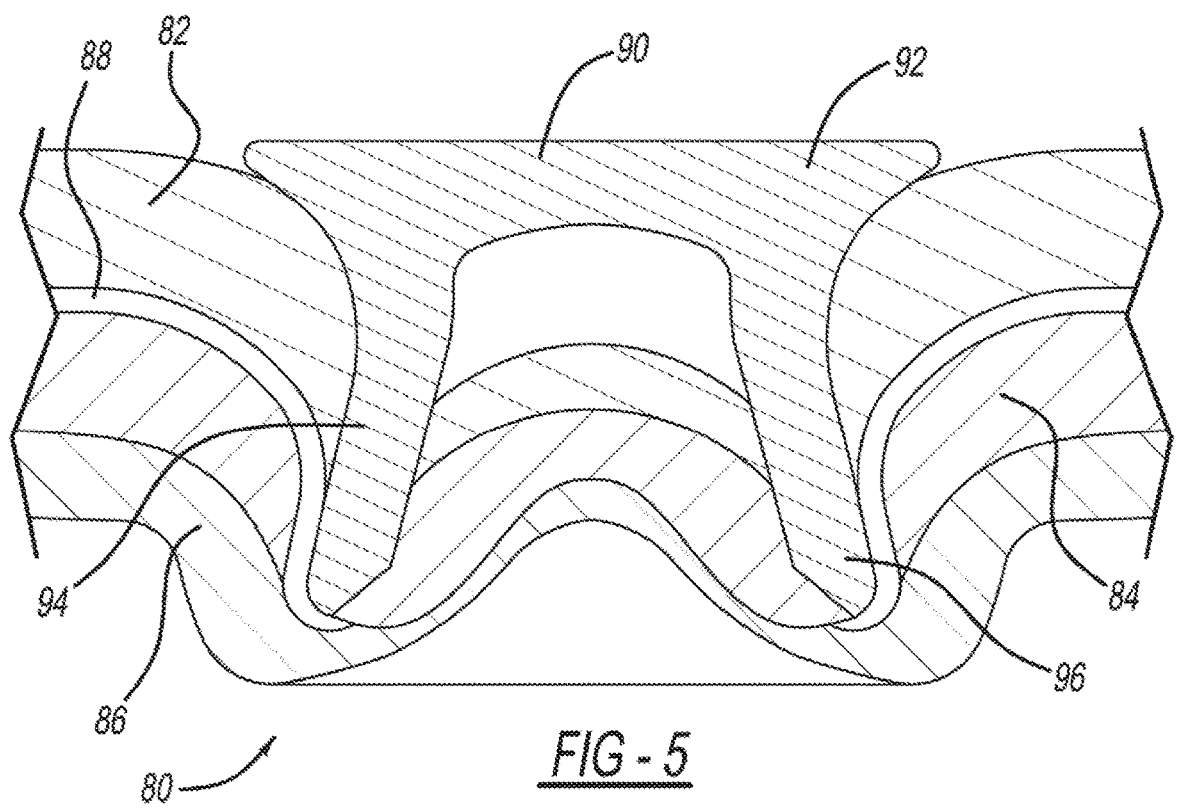
FIG. 5 is a schematic view of a joint according to a third embodiment of the disclosed inventive concept in which an insulating layer is formed between a metal top layer and a magnesium layer.

FIG. 5 illustrates an additional alternate embodiment of the disclosed inventive concept in which a schematic view of a joint, generally illustrated as 80, is shown. A metal top layer 82 is provided as the outer layer. The metal top layer 82 may be of any type of metal, including steel. A magnesium layer 84 is positioned over a metal layer 86. The metal layer 86 may be any of several metals including, but not limited to, steel, such as carbon steel grade (DP800).

An insulating layer 88 is positioned between the metal top layer 82 and the magnesium layer 84. The insulating layer 88 may be composed of any of several materials, including, but not limited to, aluminum or synthetic cellulose acetate. Preferably, the insulating layer 88 has an adhesive layer on one or both sides. The adhesive layer(s) may be composed of any of several materials, including, but not limited to, synthetic cellulose acetate. The adhesive layer may be composed of, for example, synthetic rubber resin and may include a release tape (not shown) that is removed prior to installation.

A metal mechanical fastener 90 is inserted in a known manner to thereby attach together the metal top layer 82, the insulating layer 88, the magnesium layer 84, and the metal layer 86. The metal mechanical fastener 90 may be a rivet, a screw or a bolt. Possible choices for a rivet include a self-piercing rivet, a blind rivet and a solid rivet. The screw may be of several types, and may be, for example, a flow drill screw. The illustrated metal mechanical fastener 90 includes a rivet head 92, a pivot shank 94, and a pivot foot 96. The metal top layer 82 is provided to protect the insulating layer 88 and to prevent damage to the insulating layer 88 that might otherwise result upon insertion of the metal mechanical fastener 90 into the layers of material.

According to this embodiment of the disclosed inventive concept, the insulating layer 88 and the metal top layer 82 provide a protective barrier between the metal mechanical fastener 90 and the rivet head 92 and the magnesium layer 84, thus preventing direct contact between the metal mechanical fastener 90 and the rivet head 92 and the magnesium layer 84. Without direct contact of the metal mechanical fastener 90 and the rivet head 92 with the magnesium layer 84, the galvanic potential is neutralized and corrosion is prevented. Thus this embodiment of the disclosed inventive concept also provides a practical and cost-effective solution to the problem of corrosion when certain materials, such as magnesium sheets, are used in a material stack-up that is fastened together by a metal mechanical fastener.

For at least the above reasons the disclosed invention as set forth above overcomes the challenges faced by known methods and systems for the mechanical fastening together a stack-up of material having a metal top layer, such as a magnesium top layer. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A system for attaching layers of material together comprising:
   a lower layer of a material;
   a first layer of metal positioned over and in direct contact with said lower layer of material;
   an insulating layer positioned over said first layer of metal, said insulating layer being composed of aluminum and including an adhesive layer adhering said insulating layer to said first layer of metal;
   a second layer of metal positioned over said insulating layer; and a metal mechanical fastener selected from the group consisting of rivets, screws and bolts, the metal mechanical fastener joining the lower layer of material to the first layer of metal.

2. The system for attaching layers of material together of claim 1 wherein said first layer of metal positioned on said lower layer of material is magnesium.

3. The system for attaching layers of material together of claim 1 wherein said metal mechanical fastener is a rivet, the rivet being selected from the group consisting of self-piercing rivets, blind rivets, and solid rivets.

4. The system for attaching layers of material together of claim 3 in which said rivet includes a rivet head and wherein said rivet head is insulated from contact with said first layer of metal positioned over said lower layer of material.

5. The system for attaching layers of material together of claim 1 in which said lower layer of material is selected from the group consisting of steel and a carbon-fiber composite.

6. The system for attaching layers of material together of claim 1 in which said adhesive layer is composed of synthetic rubber resin.

7. The system for attaching layers of material together of claim 1 in which said mechanical metal fastener passes through said second layer of metal positioned over said insulating layer.

8. The system for attaching layers of material together of claim 7 in which said metal mechanical fastener passes through said insulating layer, and through said first layer of metal positioned over said lower layer of material.

9. The system for attaching layers of material together of claim 8 in which said metal mechanical fastener partially pierces said lower layer of material.

\* \* \* \* \*